United States Patent [19]

Saito et al.

[11] Patent Number: 5,385,969
[45] Date of Patent: Jan. 31, 1995

[54] RADIAL TIRE FOR PASSENGER CARS

[75] Inventors: Yuichi Saito, Kobe; Naohiko Kikuchi, Nishinomiya, both of Japan

[73] Assignee: Sumitomo Rubber Industries, Ltd., Kobe, Japan

[21] Appl. No.: 992,459

[22] Filed: Dec. 17, 1992

Related U.S. Application Data

[63] Continuation-in-part of Ser. No. 616,914, Nov. 21, 1990, abandoned.

[30] Foreign Application Priority Data

Nov. 28, 1989 [JP] Japan .................. 1-308232

[51] Int. Cl.$^6$ ............................... C08K 3/04
[52] U.S. Cl. .................. 524/496; 524/495; 524/505; 524/526; 524/575
[58] Field of Search ............... 524/505, 526, 575, 485, 524/496

[56] References Cited

U.S. PATENT DOCUMENTS

| | | | |
|---|---|---|---|
| 4,485,205 | 11/1984 | Fujimaki et al. | 524/526 |
| 4,745,150 | 5/1988 | Ida et al. | 524/505 |

FOREIGN PATENT DOCUMENTS

| | | |
|---|---|---|
| 254766 | 2/1988 | European Pat. Off. . |
| 0263885 | 4/1988 | European Pat. Off. . |
| 3823662 | 7/1988 | Germany . |

OTHER PUBLICATIONS

*Kautschuk & Gummi*, vol. 39, No. 1, Jan. 1986, pp. 30–32, Y. Saito, Kobe (Japan) entitled "New Polymer Development for Low Rolling Resistance Tyres".

*Primary Examiner*—Edward Cain

[57] ABSTRACT

The present invention provides radial tires which exhibit physical properties in the diagonal area of FIG. 1 and which are suitable for passenger cars equipped with an anti-lock brake system. The radial tires of the present invention have an aspect ratio of 70% or less and comprises a tread, a pair of side walls, a pair of bead portions, each having a bead apex disposed therein, the bead apex having a JIS hardness or 85 or more, and a first and a second breaker, wherein the tread has a tan δ peak temperature (Tp) of −40° to −5° C., a one side half width (W/2) of 25° C. or less and a JIS-A hardness of 56 to 72; the tan δ peak temperature (Tp) and the one side half width being obtained from a viscoelasticity (tan δ) temperature distribution curve which is determined using a viscoelastic spectrometer a frequency of 10 Hz, and initial strain of 10%, an amplitude of ±0.25% and a temperature elevating rate of 2° C./min, the one side half width (W/2) being the range of temperatures being equal to and greater than Tp to the temperature defined by the point of intersection of the line of tan $\delta = \frac{1}{2}P$, where P is the peak value of tan δ, with the distribution curve. The ratio for the second breaker $W_B$ to tire width $W_T$ is 0.6 or greater.

3 Claims, 2 Drawing Sheets

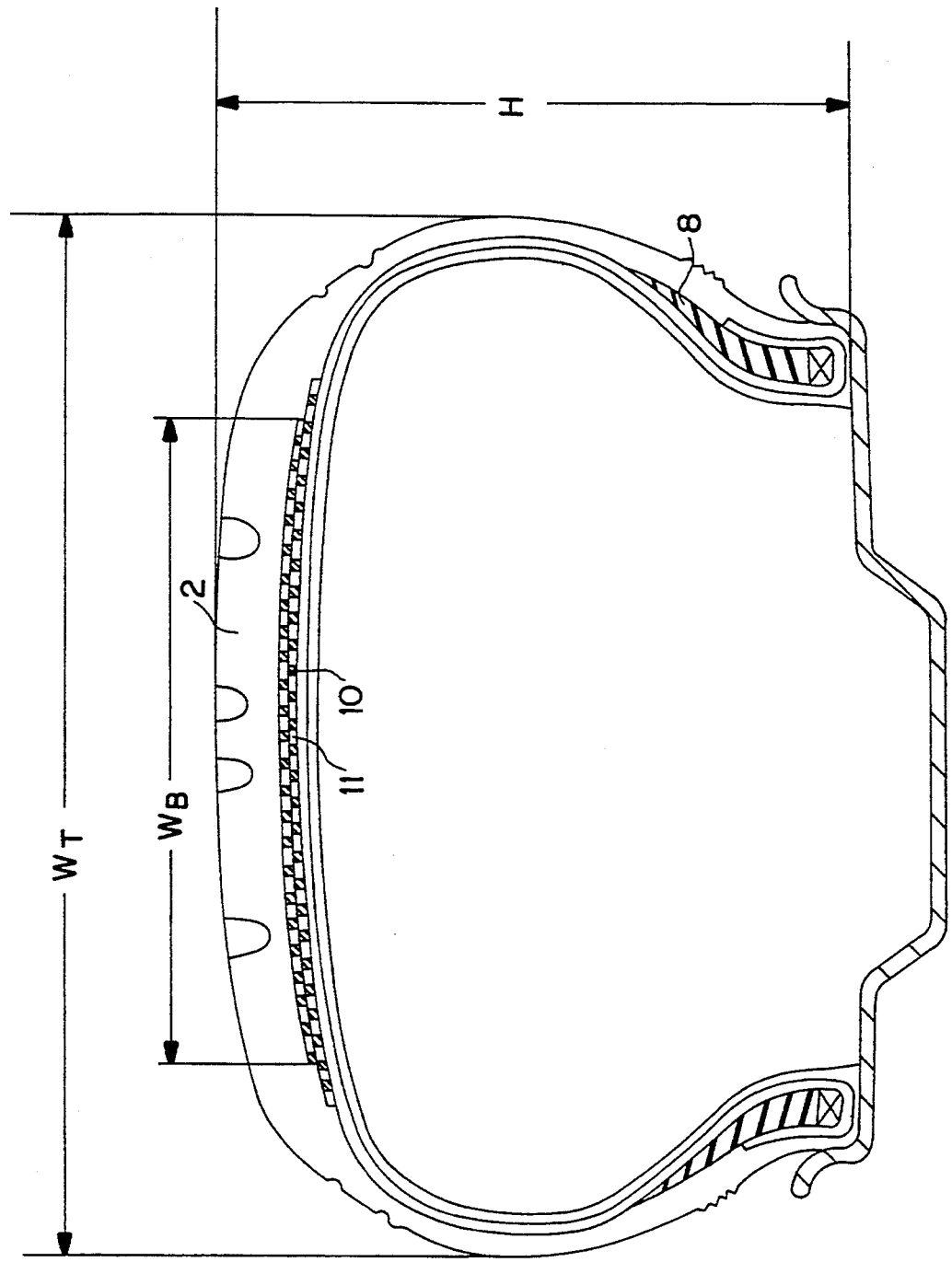

RADIAL TIRE FOR PASSENGER CARS

This application is a continuation-in-part of U.S. Ser. No. 07/616,914 filed Nov. 21, 1990 now abandoned.

FIELD OF THE INVENTION

The present invention relates to a radial tire for passenger cars. Particularly, it relates to a radial tire for passenger cars having an anti-lock brake system.

BACKGROUND OF THE INVENTION

Passenger cars now have very high performance, because many improvements have been made on engines and other mechanical or electrical elements of the cars. For example, the power output of engines is enhanced and the body weight is lightened. Also, starting, accelerating and turning properties are significantly improved. The progress of such moving properties requires an improvement of braking properties such that cars safely stop under all road conditions i.e., dry roads, wet roads, different friction roads and slippery roads (e.g. ice and snow surface).

In the conventional braking system, on the slippery surface, such as an ice surface tires, are locked immediately when the brakes are applied, and the cars become out of control. This is very dangerous. An anti-lock brake system (ABS) which has been employed since 1978 is a mechanical or electronic system in which the brakes are loosened as soon as the tires are locked. The ABS can safely stop cars under any road conditions without disturbing the car.

On the other hand, FIG. 1 shows a relation between slip ratio of tires and both friction coefficient and cornering force. As is apparent from FIG. 1, the slip ratio indicates a maximum value at a certain point at which braking is most effective. The anti-lock brake system controls the slip ratio of tires to near the maximum value. On the other hand, the cornering force indicates a maximum value at zero slip ratio and reduces as the slip ratio increases. When the tires are completely locked by the brakes (i.e. 100% slip ratio), the cornering force is zero, thus causing the car to be out of control. If both friction coefficient and cornering force are taken into consideration, it is preferred that the maximum value of friction coefficient is present a lower slip ratio in view of the cornering force, but if it is present at very low slip ratio (e.g. less than 10%), it becomes very difficult to control braking. As the result, it is most preferred that a maximum value of the friction coefficient is present at the slip ratio of 10 to 20%, as shown with the diagonal area in FIG. 1. The radial tires which have the above mentioned properties are very suitable for the passengers cars equipped with the anti-lock brake system.

SUMMARY OF THE INVENTION

The present invention provides radial tires which exhibit physical properties in the diagonal range of FIG. 1 and which are suitable for the passenger cars equipped with the anti-lock brake system. A radial of the present invention comprises a tread, pair of a side walls, a pair of bead portions, each of the pair of bead portions having a bead apex disposed therein, a carcass and a breaker having two plies, the breaker being radially disposed radially inside the tread, wherein the tread has a tan $\delta$ peak temperature (Tp) of $-40°$ to $-5°$ C., a one side half width (W/2) near the tan $\delta$ peak temperature of 25° C. or less and a JIS-A hardness of 56 to 72; the tan $\delta$ peak temperature and one side half width being obtained from a viscoelasticity (tan $\delta$) temperature distribution curve which is determined using a viscoelastic spectrometer at a frequency of 10 Hz, an initial strain of 10%, an amplitude of $\pm 0.25\%$ and a temperature elevating rate of 2° C./min.

BRIEF EXPLANATION OF THE DRAWINGS

FIG. 3 shows structural elements of the invention.

DETAILED DESCRIPTION OF THE INVENTION

Figure 1:
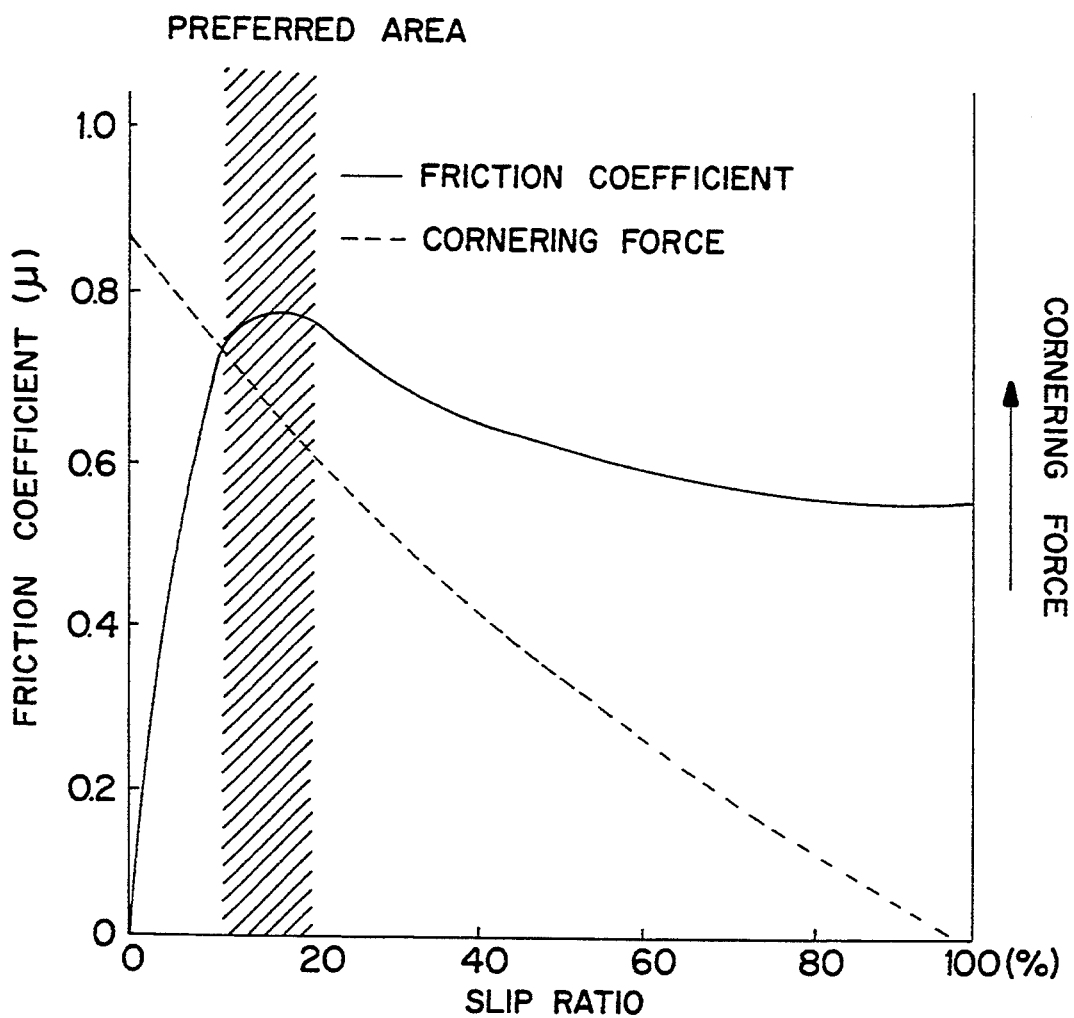
FIG. 1 shows a relation between slip ratio of tires and both friction coefficient and cornering force.
Figure 2:
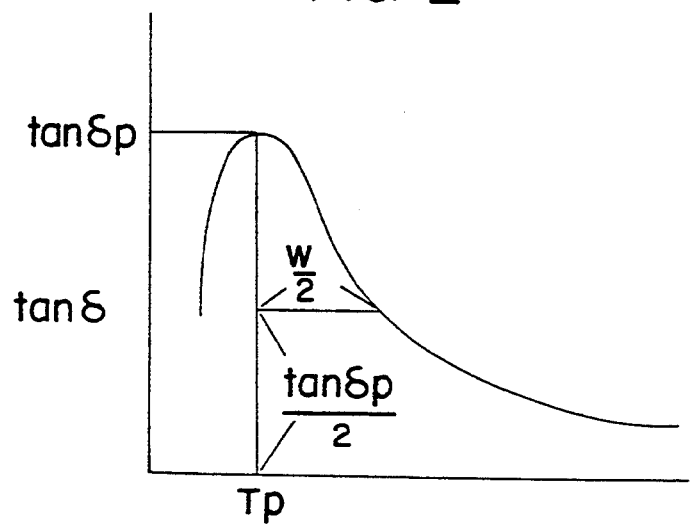
FIG. 2 shows an example of a viscoelasticity temperature distribution curve for explaining the viscoelasticity (tan $\delta$) peak temperature and one side half width.

The viscoelasticity temperature distribution curve is obtained using a viscoelastic spectrometer (available from Iwamoto Manufacturing Co., Ltd.) at a frequency of 10 Hz, an initial strain of 10%, an amplitude of $\pm 0.25\%$ an a temperature elevating rate of 2° C./min. FIG. 2 shows an example of a general viscoelasticity temperature distribution curve determined at the above conditions. In FIG. 2, the abscissa shows temperature and ordinate shows viscoelasticity (tan $\delta$). The viscoelasticity peak temperature is indicated Tp in FIG. 2. The one side half width which is indicated as W/2 is a distance between two points where the line of ½ peak viscoelasticity (tan $\delta$p) is crossed with both the perpendicular line at Tp and the obtained curve.

If Tp is less than $-40°$ C., braking properties and turning properties are deteriorated. If Tp is more than $-5°$ C., grip properties on winter roads significantly deteriorate. If the half width is more than 25° C., a slip ratio which indicates a maximum friction degree increases more than 20% and does not accomplish the object of the present invention.

While radial tires are often composed of a tread, a pair of side walls, a pair of bead portions, each of the pair of bead portions having a bead apex disposed therein, a carcass and a first and a second breaker, in the present invention the tread has the above mentioned properties. The tread also indicates a JIS-A hardness of 56 to 72, preferably 60 to 68. If the hardness is less than 56, the rubber is so soft that cornering power and cornering force may be lowered and it is difficult to turn. If it is more than 72, the rubber is so hard that riding feeling may be poor. Also, the contact area between the road and the tire is lowered, thus lowering grip properties.

The tread is generally prepared from a rubber composition which comprises a rubber component, a reinforcing material and a vulcanizing agent. A method for producing the tread of the present invention is known to persons skilled in the art, but the adjustment of the physical properties as mentioned above is generally conducted by selecting rubber components, crosslinking agents, amounts of the crosslinking agents, a vulcanizing time and the like.

The rubber component suitable for the tread of the present invention includes styrene butadiene rubber, high vinyl butadiene rubber, 3,4-isoprene rubber, isoprene butadiene rubber and the like. Particularly, it is preferred that the rubber component contains at least 80% by weight of a solution polymerized styrene butadiene rubber a vinyl content in the butadiene portion of 20 to 75% by weight and which has a styrene content of 15 to 38% by weight and which has random styrene distribution. If the styrene content are outside the above range, Tp is not within the range of $-40°$ to $-5°$ C. If the vinyl content in the butadiene portion is less than 20%, Tp is less than $-40°$ C. and undesirable because of poor braking properties. If the vinyl content is more than 75%, rubber strength is deteriorated to result in poor wear resistance and poor tread groove cracking resistance. If the styrene distribution is not random, thus if some styrene-block portion or styrene-continuous portion is present, then the half width (W/2) is more than 25° C.

The reinforcing material of the rubber composition is one which is used for tire treads, for example carbon black. The carbon black preferably has a particle size of 15 to 35 micrometer. Particle sizes of less than 15 micrometer increase exothermic heat and rolling resistance and those of more than 35 micrometer deteriorate wear resistance and grip properties. The vulcanizing agent is generally sulfur, but others (e.g. organic peroxides) may be used.

The rubber composition may contain additives, such as wax, oil, antioxidant, filler, vulcanization accelerator and the like.

EXAMPLES

The present invention is illustrated by the following Examples which, however, are not to be construed as limiting the invention to their details.

EXAMPLE 1

The synthetic rubber having the characteristics as shown in Table 1 was employed and a rubber composition was prepared from the ingredients and amounts as shown in Table 2. The structure of the tire in Example 1 is shown in FIG. 3, such structure being identical for the tires of Examples 2-4 hereinbelow. The tire has a pair of bead apexes 8, shaped from hard rubber in a triangular form, one disposed in each bead portion, a tread 2, and a breaker of two plies 10, 11 disposed radially outside the carcass, the radially outer belt ply 10 having an axial width $W_B$. The aspect ratio of the tire is the height (H) the tire at pressure condition divided by the maximum width of the tire ($W_T$). The bead apexes 8 have a JIS-A hardness of 91. The ratio $W_B/W_T$ of the radially outer breaker ply width $W_B$ to the tire width $W_T$ is 0.68.

If the aspect ratio is more than 70% grip property and driving stability would be poor. If the ratio of $W_B/W_T$ is less than 0.6, grip property at cornering is poor and driving stability also is poor. If the Bead Apex hardness is less than 85, side stiffness is poor and driving stability is poor.

TABLE 1

|  | Styrene content (% by weight) | Vinyl content in butadiene portion (% by weight) | Styrene Distribution |
|---|---|---|---|
| Emulsion polymerized styrene butadiene rubber | | | |
| (a)*1 | 23.5 | 18 | Random |
| (b)*2 | 35 | 18 | Random |
| (c)*3 | 45 | 18 | Random |
| (d) | 60 | 18 | Random |
| Solution polymerized Styrene butadiene rubber | | | |
| (A) | 10 | 13 | Random |
| (B)*4 | 18 | 13 | Random |
| (C) | 15 | 35 | Random |
| (D) | 30 | 35 | Random |
| (E) | 30 | 40 | Random |
| (F) | 20 | 70 | Random |
| (G) | 35 | 50 | Random |
| (H) | 40 | 40 | Random |
| (K) | 40 | 50 | Random |
| (L) | 20 | 70 | Some styrene succession portions |

*1Sumitomo Chemical Co., Ltd. SBR 1712
*2Nippon Zeon Co., Ltd. NIPOL9520
*3Nippon Zeon Co., Ltd. NIPOL9521
*4Asahi Chemical Industry Co., Ltd. Toughden 1530
Call have an oil extending amount of 37/5 phr.

TABLE 2

| Oil extended styrene butadiene rubber | 137.5 |
|---|---|
| Carbon Black | 95 |
| Aroma oil | 12.5 |
| Wax | 2 |
| Antioxidant* | 2 |
| Stearic acid | 1 |
| Zinc white | 3 |
| Sulfur | 2 |
| Vulcanization accelerator | 1 |

(*N,N'-phynyl-p-phenylenediamine)

A tire having 225/50R16 size was prepared from the rubber composition. A slip ratio of a maximum friction coefficient was obtained from the friction coefficient—slip curve. A braking test and turning test were subjected on wet road to an anti-lock brake system car (ABS car) and a non-ABS car, using the tires obtained above. The results are shown in Table 3.

The obtained tire tread was subject to a JIS-A hardness meter and the results also are shown in Table 3. A rubber sample (4 mm×2 mm×40 mm) was taken from the tread and subjected to a spectrometer available from Iwamoto Manufacturing Co., Ltd. to obtain a viscoelasticity temperature distribution curve. The viscoelasticity peak temperature and one side half width are shown in Table 3.

An evaluation of the tire was conducted as follows.

(1) Slip ratio (%) at which Max $\mu$ is present

A slip ratio and friction coefficient ($\mu$) curve was obtained using a special tractor at a tire inside pressure of 2.4 Kg f/cm², a load of 350 Kg f and a speed of 40 Km/h. Max $\mu$ was obtained from the curve.

(2) Brake index

A speed of a 2,000 cc ABS car having the tires of the present invention at an inside pressure of 2.4 Kg f/cm² was reduced from 40 Km/h to 20 Km/h to obtain a retardation. Numbers in Table 3 are indexes which are calculated as the tire of sample A being 100.

The roads for the tests (1) and (2) were an asphalt road of Skid No. about 50 and a concrete road of Skid No. about 35.

(3) Turning properties

A person road in a 2,000 cc car having the tires of the present invention and drove while turning on an asphalt surface having a diameter of 50 m. After driving, feeling of turning was evaluated with five grades. The larger the number, the better the feeling.

(4) Rolling resistance.

A rolling resistance was determined using a rolling resistance tester at a speed of 80 Km/h, an inside pressure of 2.4 Kg f/cm² and a load of 350 Kg f. Numbers in table 3 are indexes which are calculated as the tire of Sample A being 100. The smaller the number, the better the rolling resistance.

ABS car. Since the tire of sample C has higher Tp and hardness, braking properties are poor. The tire of sample D has poor braking properties because of low Tp. The tire of sample E has poor rolling resistance.

EXAMPLE 2

This shows tires prepared form a mixture of synthetic rubbers. The rubbers employed and ingredients are based on Tables 1 and 2. Tires were prepared as generally described in Example 1 and the evaluations were also conducted as generally described in Example 1.

As is apparent from Table 4, in the case where a mixture of styrene butadiene rubbers having different Tp was employed, the one side half widths become higher and the slip ratios indicating Max $\mu$ become higher, thus deteriorating braking properties.

EXAMPLE 3

This shows tires prepared from a solution of polymerized SBR having random styrene distribution and a solution of polymerized SBR having some styrene suc-

TABLE 3

| Sample No. | | | Comparative Examples | | | | | Examples | | | | |
|---|---|---|---|---|---|---|---|---|---|---|---|---|
| | | | A | B | C | D | E | F | G | H | I | J |
| Oil extended SBR | | | (a) | (b) | (d) | (B) | (H) | (C) | (D) | (E) | (F) | (G) |
| Tan δ peak temperature (°C.) | | | −30 | −18 | +12 | −48 | −2 | −38 | −20 | −16 | −14 | −10 |
| One side half width W/2(deg) | | | 26 | 25 | 22 | 27 | 18 | 21 | 20 | 18 | 16 | 22 |
| Hardness JIS-A | | | 68 | 71 | 88 | 65 | 71 | 68 | 67 | 67 | 65 | 70 |
| Tan δ 70° C. | | | 0.319 | 0.364 | 0.431 | 0.311 | 0.372 | 0.313 | 0.311 | 0.333 | 0.346 | 0.321 |
| Tire proper- ties | Wet asphalt roads | Slip ratio (%) at Max μ | 12 | 10 | 7 | 12 | 8 | 12 | 11 | 13 | 12 | 11 |
| | | Brake index of ABS car | 100 | 102 | 95 | 90 | 103 | 100 | 103 | 104 | 105 | 104 |
| | | Brake indes of non ABS car | 100 | 103 | 92 | 86 | 105 | 100 | 104 | 104 | 103 | 104 |
| | | Turning properties | 3 | 4 | 1 | 2 | 4 | 3 | 4 | 5 | 5 | 5 |
| | Wet smooth roads | Slip ratio (%) at Max μ | 25 | 25 | 15 | 30 | 16 | 18 | 16 | 15 | 15 | 14 |
| | | Brake index of ABS car | 100 | 101 | 88 | 90 | 97 | 102 | 103 | 105 | 108 | 106 |
| | | Brake indes of non ABS car | 100 | 100 | 85 | 90 | 98 | 100 | 101 | 103 | 102 | 103 |
| Rolling resistance | | | 100 | 107 | 140 | 96 | 108 | 100 | 95 | 101 | 102 | 100 |

TABLE 4

| Sample No. | | | Comparative Examples | | Examples | |
|---|---|---|---|---|---|---|
| | | | K | L | M | N |
| Oil extended SBR (parts by weight) | | | (a) 68.75 (K) 44.75 (A) 24.0 | (D) 68.75 (C) 48.15 (d) 20.60 | (E) 137.5 | (C) 137.5 |
| Tan δ peak temperature (°C.) | | | −16 | −9 | −16 | −10 |
| One side half width W/2(deg) | | | 43 | 50 | 18 | 22 |
| Hardness JIS-A | | | 66 | 68 | 67 | 70 |
| Tan δ 70° C. | | | 0.336 | 0.323 | 0.333 | 0.321 |
| Tire proper- ties | Wet asphalt roads | Slip ratio (%) at Max μ | 13 | 16 | 13 | 11 |
| | | Brake index of ABS car | 99 | 97 | 104 | 104 |
| | | Brake indes of non ABS car | 104 | 105 | 104 | 104 |
| | | Turning properties | 3 | 3 | 5 | 5 |
| | Wet smooth roads | Slip ratio (%) at Max μ | 45 | 40 | 15 | 14 |
| | | Brake index of ABS car | 98 | 95 | 105 | 106 |
| | | Brake indes of non ABS car | 103 | 104 | 103 | 103 |
| Rolling resistance | | | 102 | 101 | 101 | 100 |

As is apparent from Table 3, the one side half widths of the Examples are smaller than that of the Comparative Examples, and the Max $\mu$ is within the slip ratio range of 10 to 20%. The wet braking properties and turning properties of the Examples are superior in the cession portions. The rubbers employed and ingredients are based on Tables 1 and 2. Tires were prepared as generally described in Example 1 and the evaluations were also conducted as generally described in Example 1.

TABLE 5

| Sample No. | | Comparative O | Example P |
|---|---|---|---|
| Oil extended SBR | | (L) 137.5 | (F) 137.5 |
| Tan δ peak temperature (°C.) | | −14 | −14 |
| One side half width W/2(deg) | | 67 | 16 |
| Hardness JIS-A | | 78 | 65 |
| Tan δ 70° C. | | 0.348 | 0.346 |
| Tire Wet | Slip ratio (%) at Max μ | 30 | 12 |

TABLE 5-continued

| Sample No. | | | Comparative O | Example P |
|---|---|---|---|---|
| proper- | asphalt | Brake index of ABS car | 96 | 105 |
| ties | roads | Brake index of non ABS car | 99 | 103 |
| | | Turning properties | 4 | 5 |
| | Wet | Slip ratio (%) at Max μ | 40 | 15 |
| | smooth | Brake index of ABS car | 89 | 108 |
| | concrete roads | Brake index of non ABS car | 100 | 102 |
| Rolling resistance | | | 104 | 102 |

As is apparent from Table 5, the SBR having random styrene distribution imparts good properties, but the SBR having some styrene succession distribution imparts poor braking properties with a ABS car.

EXAMPLE 4

This example shows the difference of tire properties in considering the ratio of the radially outer breaker ply width ($W_B$)/tire width ($W_T$) and the bead apex hardness (JIS-A). The rubbers employed and ingredients are based on Tables 1 and 2. Tires were prepared as generally described in Example 1, except the bead apex hardness and the ratio $W_B/W_T$ are as stated in Table 6. The evaluations were also conducted as generally described in Example 1, with the exception that the tire size was changed to 185/65R14, inside pressure is 2.0 Kg f/cm² and the car for measuring tire properties was changed to a 1,500 cc FF car with ABS.

TABLE 6

| | Comp. Ex-Q | Ex. R | Ex. S |
|---|---|---|---|
| Oil extended SBR | (C) | (C) | (D) |
| Tan δ peak temp (°C.) | −38 | −38 | −20 |
| W/2 (deg) | 21 | 21 | 20 |
| Hardness (JIS-A) | 68 | 68 | 67 |
| Tan δ 70° C. | 0.313 | 0.313 | .0311 |
| $W_B/W_T$ | 0.58 | 0.65 | 0.63 |
| Bead Apex hardness | 82 | 91 | 88 |
| Tire properties | | | |
| (Wet asphalt) | | | |
| Slip Ratio (%) at Max μ | 11 | 11 | 10 |
| Brake index of ABS car | 100 | 104 | 109 |
| Brake index of non ABS car | 100 | 102 | 103 |
| Turning Properties | 3 | 5 | 5 |
| (Wet smooth concrete roads) | | | |
| Slip ratio (%) at Max μ | 20 | 18 | 15 |
| Brake index of ABS car | 100 | 105 | 108 |
| Brake index of non ABS car | 100 | 100 | 101 |
| Rolling resistance | 100 | 98 | 97 |
| Half width W (°C.) | 33 | 33 | 31 |

As shown in Table 6, in comparison with Comparative Example Q, Examples R and S which were controlled to $W_B/W_T$ of 0.6 or more and Bead Apex hardness of 85 or more have excellent turning properties and ABS braking properties.

What is claimed is:

1. A radial tire for passenger cars comprising a tread, a pair of side walls, a pair of bead portions, each of the pair of bead portions having a bead apex disposed therein, a carcass, and a breaker having a radially inner ply and a radially outer ply, wherein said tread has a tan δ peak temperature (Tp) of −40° to −5° C., a one side half width (W/2) of 25° C. or less and a JIS-A hardness of 56 to 72; said tan δ peak temperature (Tp) and said one side half width being obtained from a viscoelasticity (tan δ) temperature distribution curve which is determined using a viscoelastic spectrometer at a frequency of 10 Hz, an initial strain of 10%, an amplitude of ±0.25% and a temperature elevating rate of 2° C./min, said one side half width (W/2) being the range of temperatures being equal to and greater than Tp to the temperature defined by the point of intersection of the line of tan δ=½P, wherein P is the peak value of tan δ, with the distribution curve, said tread being obtained from a rubber composition comprising a rubber component, a reinforcing material and a vulcanizing agent, said rubber component containing at least 80% by weight of a solution-polymerized styrene butadiene rubber having a styrene content of 15 to 38% by weight, a vinyl content in the butadiene portion of 20 to 75% by weight and random styrene distribution, said reinforcing material being carbon black having a particle size of 15 to 35 micrometer, the tire has an aspect ratio of 70% or less, the aspect ratio being the height of the tire at pressure condition divided by the tire width $W_T$, the radially outer ply having an axial width $W_B$, the ratio $W_B/W_T$ is 0.6 or greater, and the JIS-A hardness of the bead apex is 85 or more.

2. The radial tire according to claim 1 wherein said vulcanizing agent is sulfur.

3. The radial tire according to claim 1 wherein said rubber composition further contains wax, oil, antioxidant, filler and vulcanization accelerator.

* * * * *